(12) United States Patent
Tian et al.

(10) Patent No.: US 11,014,228 B2
(45) Date of Patent: May 25, 2021

(54) HIGH-PERFORMANCE FOUR-AXIS ROBOT WITH HORIZONTAL JOINT

(71) Applicant: HUILING-TECH ROBOTIC CO., LTD, Shenzhen (CN)

(72) Inventors: Jun Tian, Shenzhen (CN); Yaojun Liu, Shenzhen (CN)

(73) Assignee: HUILING-TECH ROBOTIC CO., LTD, Guangdong (CN)

( * ) Notice: Subject to any disclaimer, the term of this patent is extended or adjusted under 35 U.S.C. 154(b) by 0 days.

(21) Appl. No.: 16/484,738

(22) PCT Filed: May 31, 2018

(86) PCT No.: PCT/CN2018/089168
§ 371 (c)(1),
(2) Date: Aug. 8, 2019

(87) PCT Pub. No.: WO2019/114206
PCT Pub. Date: Jun. 20, 2019

(65) Prior Publication Data
US 2020/0298397 A1  Sep. 24, 2020

(30) Foreign Application Priority Data
Dec. 12, 2017  (CN) .......................... 201721723612.9

(51) Int. Cl.
*F16H 3/06* (2006.01)
*F16H 27/02* (2006.01)
(Continued)

(52) U.S. Cl.
CPC .................. *B25J 9/10* (2013.01); *B25J 9/104* (2013.01); *B25J 9/108* (2013.01); *B25J 9/12* (2013.01);
(Continued)

(58) Field of Classification Search
CPC ...... B25J 17/0241; B25J 17/025; B25J 18/02; B25J 18/025; B25J 18/04
See application file for complete search history.

(56) References Cited

U.S. PATENT DOCUMENTS 5,085,556 A * 2/1992 Ohtomi .................... B25J 9/023
414/744.3
5,099,707 A * 3/1992 Tori .......................... B25J 9/02
74/490.03
(Continued)

FOREIGN PATENT DOCUMENTS

CN  203622444 U   6/2014
CN  105081757 A  11/2015
(Continued)

OTHER PUBLICATIONS

English Machine Translation to Abstract CN105081757.
(Continued)

*Primary Examiner* — Jake Cook
(74) *Attorney, Agent, or Firm* — Cantor Colburn LLP

(57) ABSTRACT

A high-performance four-axis robot (1) with horizontal joints includes a robot body (11), a first arm assembly (12) connected to the robot body 11, a second arm assembly (13) that one end thereof is connected to the first arm assembly, and a R-axis rotation assembly arranged at the other side of the second arm assembly opposite to the first arm assembly. Assembly of the robot body includes a linear assembly unit (115) arranged in a vertical direction, a fixed seat (111) capable of moving up and down along the linear assembly unit, and a drive assembly (14) configured to drive the fixed seat to move and arranged at a lower portion of the linear assembly unit. The drive assembly includes a first drive motor (141) arranged at the lower portion of the linear assembly unit and a coupling (142) connected to an output shaft of the first drive motor.

7 Claims, 7 Drawing Sheets

(51) Int. Cl.
    *F16H 29/02*     (2006.01)
    *F16H 29/20*     (2006.01)
    *B25J 9/10*     (2006.01)
    *B25J 9/12*     (2006.01)
    *B25J 19/00*     (2006.01)
    *F16H 7/02*     (2006.01)
    *F16H 25/24*     (2006.01)

(52) U.S. Cl.
    CPC .......... *B25J 19/0004* (2013.01); *F16H 7/023* (2013.01); *F16H 25/2454* (2013.01)

(56) References Cited

U.S. PATENT DOCUMENTS

| | | | | |
|---|---|---|---|---|
| 5,566,436 | A * | 10/1996 | Hirata | B23P 19/02 29/33 K |
| 8,240,971 | B2 * | 8/2012 | Sandmeier | B25J 9/041 414/744.5 |
| 8,708,349 | B1 * | 4/2014 | Setzer, Sr. | B25J 9/041 280/35 |
| 9,610,694 | B2 * | 4/2017 | Duval | B25J 21/02 |
| 2002/0078778 | A1 * | 6/2002 | Grover | B25J 9/101 74/490.03 |
| 2005/0196263 | A1 * | 9/2005 | Tamura | B25J 9/023 414/744.5 |
| 2016/0193735 | A1 * | 7/2016 | Krumbacher | B25J 17/00 74/490.02 |
| 2016/0361123 | A1 | 12/2016 | Hares et al. | |

FOREIGN PATENT DOCUMENTS

| | | |
|---|---|---|
| CN | 106426104 A | 2/2017 |
| CN | 106737844 A | 5/2017 |
| KR | 20030060833 | 7/2003 |
| KR | 1020140021752 A | 2/2014 |

OTHER PUBLICATIONS

English Machine Translation to Abstract CN106426104.
English Machine Translation to Abstract CN106737844.
English Machine Translation to Abstract CN203622444.
English Machine Translation to Abstract KR20030060833.
English Machine Translation to Abstract KR20140021752.
International Search Report for Application No. PCT/CN2018/089168.
Written Opinion for Application No. PCT/CN2018/089168.

* cited by examiner

HIGH-PERFORMANCE FOUR-AXIS ROBOT WITH HORIZONTAL JOINT

TECHNICAL FIELD

The present application relates to the technical field of four-axis robot devices with horizontal joints, and in particular to a high-performance four-axis robot with horizontal joints, which has a structure reasonably designed, operates stably and provides high precision.

BACKGROUND

Nowadays, four-axis robots with horizontal joints have been widely used and play a very important role in the environment of handling, processing and assembly. It has the characteristics such as flexible movement, compact structure, small space requirement and high precision for repeatedly positioning etc, thereby being capable of reaching a point in a space accurately and fast. The four-axis robots with horizontal joints, compared with six-axis industrial robots, have the advantages of small size, flexibility and low cost, thus it will be an inevitable trend that the four-axis robots with horizontal joints are widely used in future industrial assembly lines. Therefore, it is very necessary to increase the research for the four-axis robots with horizontal joints. At present, the main brands of the four-axis robots with horizontal joints at home and abroad include Epson, Yamaha and KUKA etc.

Now, the structure of most existing four-axis robots with horizontal joints on the market adopts a harmonic reducer or a RV reducer, a vertical Z-axis and a rotating R-axis arranged at the end, and two robot arms including two large arms arranged at the front, thereby realizing different actions of the four-axis robot in space. This kind of robot arms has the characteristics such as large load, long arm and high precision, but the price is relatively high. Further, due to that the vertical Z-axis and the rotating R-axis are arranged at the end, the structural space at the end is relatively large, thus it is not suitable for working in a small space.

Based on the above problems, a person skilled in the art has carried out a lot of research, development and experiments regarding how to effectively optimize the structure of the device such that the robot arms are capable of being better applied to many different occasions, and has thereby achieved good results through furthering and improving in light of the structure and principles of the arms.

SUMMARY

In order to overcome the problems existed in the prior art, the present application provides a high-performance four-axis robot with horizontal joints, which has a structure reasonably designed, operates stably and provides high precision.

A solution of the present application aimed at solving the technical problems is to provide a high-performance four-axis robot with horizontal joints, which includes a robot body, a first arm assembly connected to the robot body, a second arm assembly that one end thereof is connected to the first arm assembly, and a R-axis rotation assembly arranged at a side of the second arm assembly facing away from the first arm assembly. The assembly of the robot body includes a linear assembly unit arranged in a vertical direction, a fixed seat capable of moving up and down along the linear assembly unit, and a drive assembly configured to drive the fixed seat to move and arranged at a lower portion of the linear assembly unit. The drive assembly includes a first drive motor arranged at the lower portion of the linear assembly unit, and a coupling connected to an output shaft of the first drive motor. An inner side of the fixed seat is provided with a second drive motor configured to drive the rotation of the first arm assembly relative to the robot body, and the first arm assembly is internally provided with a third drive motor configured to drive the rotation of the second arm assembly relative to the first arm assembly. The R-axis rotation assembly includes a fourth drive motor arranged at an outermost end of the second arm assembly.

Preferably, the assembly of the robot body further includes a base, a main support plate, and a side plate fixedly connected to the main support plate. The linear assembly unit is positioned between the main support plate and the side plate, and the linear assembly unit is disposed close to the main support plate. A slider seat is disposed between the linear assembly unit and the fixed seat, the fixed seat is fixedly connected with the slider seat and a side of the linear assembly unit is provided with a tank drag chain and a drag chain support configured to support the tank drag chain.

Preferably, a mounting flange configured to connect the main support plate and the side plate is further provided at an upper portion of the base as well as a lower portion of the linear assembly unit, the mounting flange is fixedly connected with the lower portions of the main support plate and the side plate, and an upper portion of the mounting flange is further fixedly provided with a main outlet board and a first motor driver board configured to drive the first drive motor to operate. The top of the linear assembly unit is fixedly provided with an electromagnetic brake, the interior of the linear assembly unit is provided with a screw shaft movably connected to the slider seat, and the first drive motor drives the screw shaft to rotate, and drives the slider seat to move up and down relative to the linear assembly unit.

Preferably, the interior of the fixed seat is further provided with a first driving synchronous wheel connected to an output shaft of the second drive motor, a first driven synchronous wheel, a first synchronous belt connecting the first driving synchronous wheel with the first driven synchronous wheel, a second encoder disposed at an upper portion of the second drive motor, and a second motor driver board configured to drive the motor to rotate. An outer side of the output shaft of the second drive motor is further provided with a first swivel bearing. A connection portion between the fixed seat and the first arm assembly is provided with a first transmission shaft connected with the first driven synchronous wheel, and a second swivel bearing and a third swivel bearing disposed on an outer side of the first transmission shaft. Moreover, the bottom of the first driven synchronous wheel is provided with a wear-resistant shaft sleeve configured to hold against an inner ring of the second swivel bearing and prevent axially movement of the first transmission shaft.

Preferably, the first arm assembly includes an upper cover of the first arm, a lower cover of the first arm, and a second driving synchronous wheel, a second driven synchronous wheel, a second synchronous belt connecting the second driving synchronous wheel with the second driven synchronous wheel and a third encoder that are disposed in an inner space formed by the upper cover of the first arm and the lower cover of the first arm. An output shaft of the third drive motor is connected with the second driving synchronous wheel. The first arm assembly further includes a third motor driver board configured to drive the third drive motor to operate and a outlet board, and an outer side of the output shaft of the third drive motor is further provided with a fourth swivel bearing. A connection portion between the first arm assembly and the second arm assembly is provided with a second transmission shaft connected with the second driven synchronous wheel, and a fifth swivel bearing and a sixth swivel bearing disposed on an outer side of the second transmission shaft. Moreover, the bottom of the second driven synchronous wheel is provided with a wear-resistant shaft sleeve configured to hold against an inner ring of the fifth swivel bearing and prevent axially movement of the second transmission shaft.

Preferably, the second arm assembly includes an upper cover of the second arm assembly, a lower cover of the second arm assembly, an I/O card, a fourth motor driver board, and a first encoder disposed on an upper portion of the fourth drive motor. Further, one end of the second arm assembly is connected to the second transmission shaft.

Preferably, a lower portion of the fourth drive motor of the R-axis rotation assembly is connected with a flange connector, and an upper portion of the fourth drive motor is connected to the second arm assembly by a screw.

Compared with the prior art, in a high-performance four-axis robot with horizontal joints of the present application, the robot body 11, the first arm assembly 12 connected to the robot body 11, the second arm assembly 13 that one end thereof is connected to the first arm assembly 12, and the R-axis rotation assembly arranged at a side of the second arm assembly 13 facing away from the first arm assembly 12 are simultaneously configured, while in combination of the drive assembly 14 arranged at the lower portion of the linear assembly unit 115 and including the first drive motor 141 and the coupling 142 connected to the output shaft of the first drive motor 141, thus the mode that a driving component is arranged at the top of the body in a conventional manner is improved through arranging the driving component at the lower portion of the body, thereby achieving higher stability and good drive performance. Further, the two robot arms are suspended, and the rotating R-axis is arranged at the end of the second arm assembly 13, thus the two robot arms and the rotating R-axis move up and down at the same time when the vertical Z-axis moves. Relatively speaking, considering the weight of the arms when moving up and down, since the robot arms with this kind of structure are lighter, have shorter arm length, relatively small load and light structure, thus it is especially suitable for light load and occasions there is a requirement for end space.

DETAILED EMBODIMENTS

In order to make the objects, technical solutions and advantages of the present application be understood more clearly, the present application will be further described in detail below with reference to the accompanying drawings and embodiments. It should be understood that, the specific embodiments described herein are merely illustrative of the present application and are not intended to limit the present application.

Figure 1:
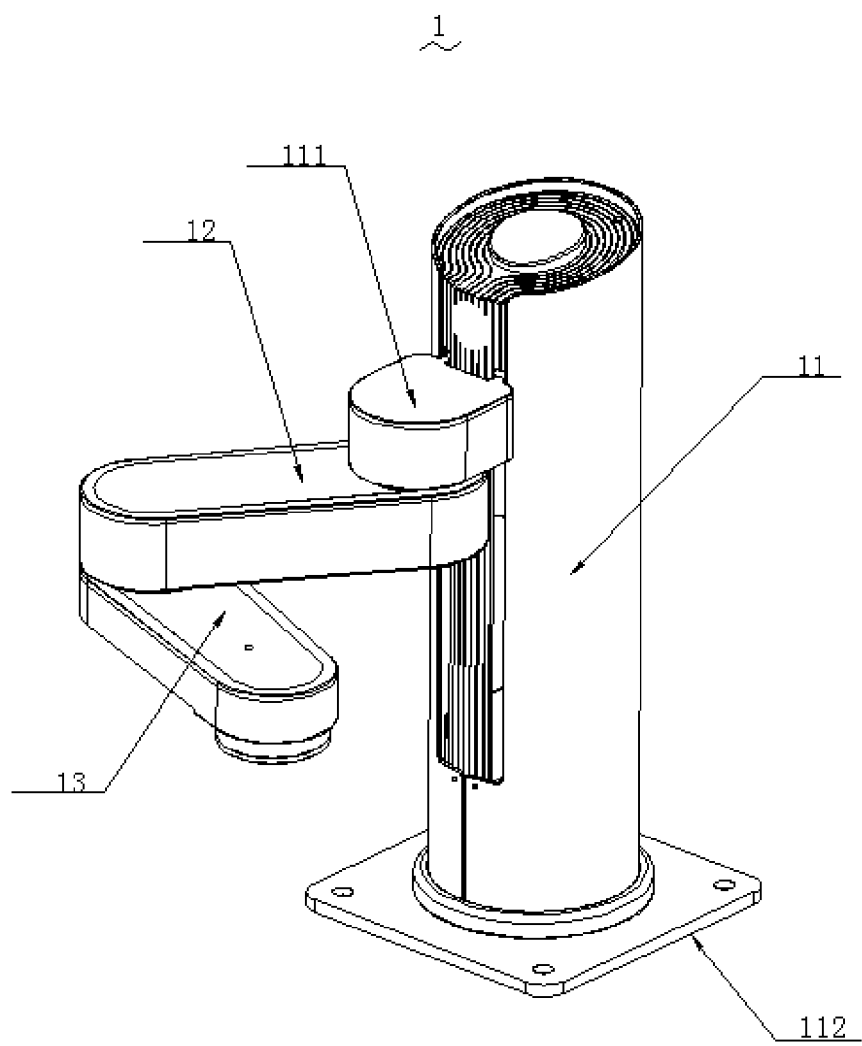
FIG. 1 is a schematic view showing the three-dimensional structure of the high-performance four-axis robot with horizontal joints according to the present application.
Figure 2:
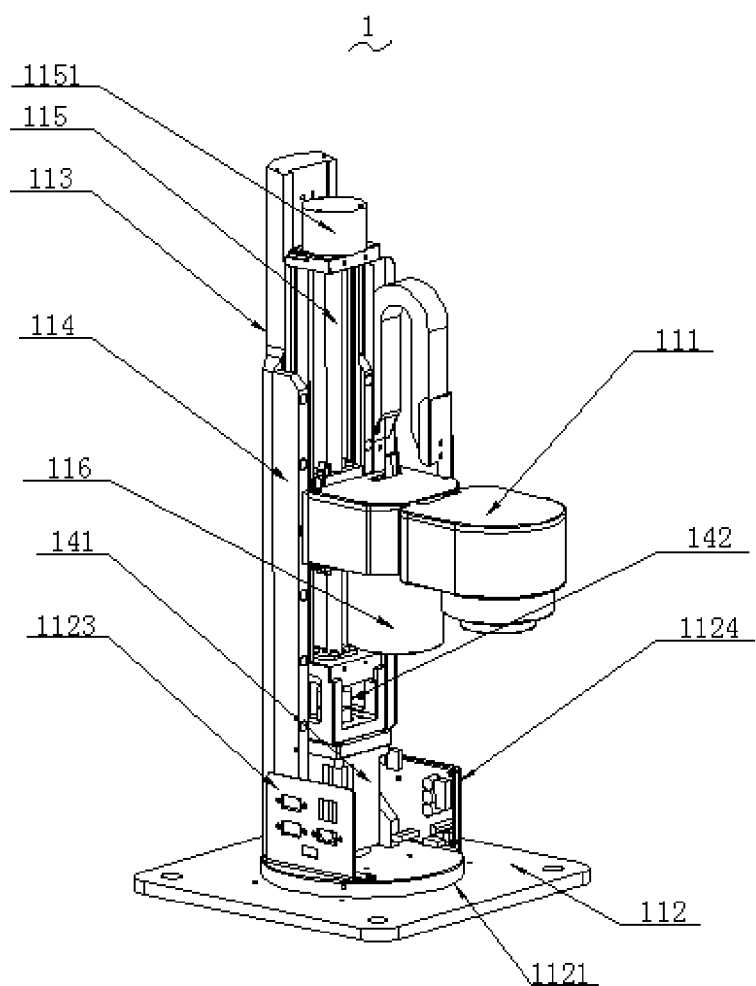
FIG. 2 is a schematic view showing the three-dimensional structure of the high-performance four-axis robot with horizontal joints from another perspective according to the present application.
Figure 3:
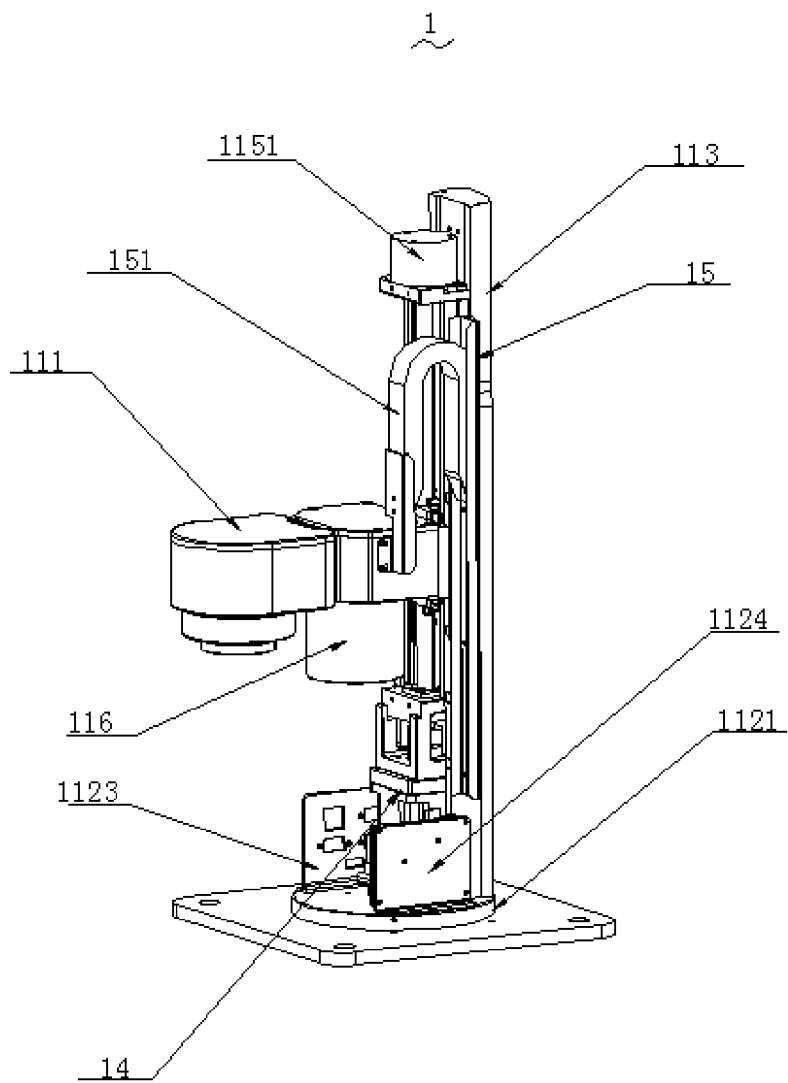
FIG. 3 is a schematic view showing the three-dimensional structure of the high-performance four-axis robot with horizontal joints from another perspective according to the present application.
Figure 4:
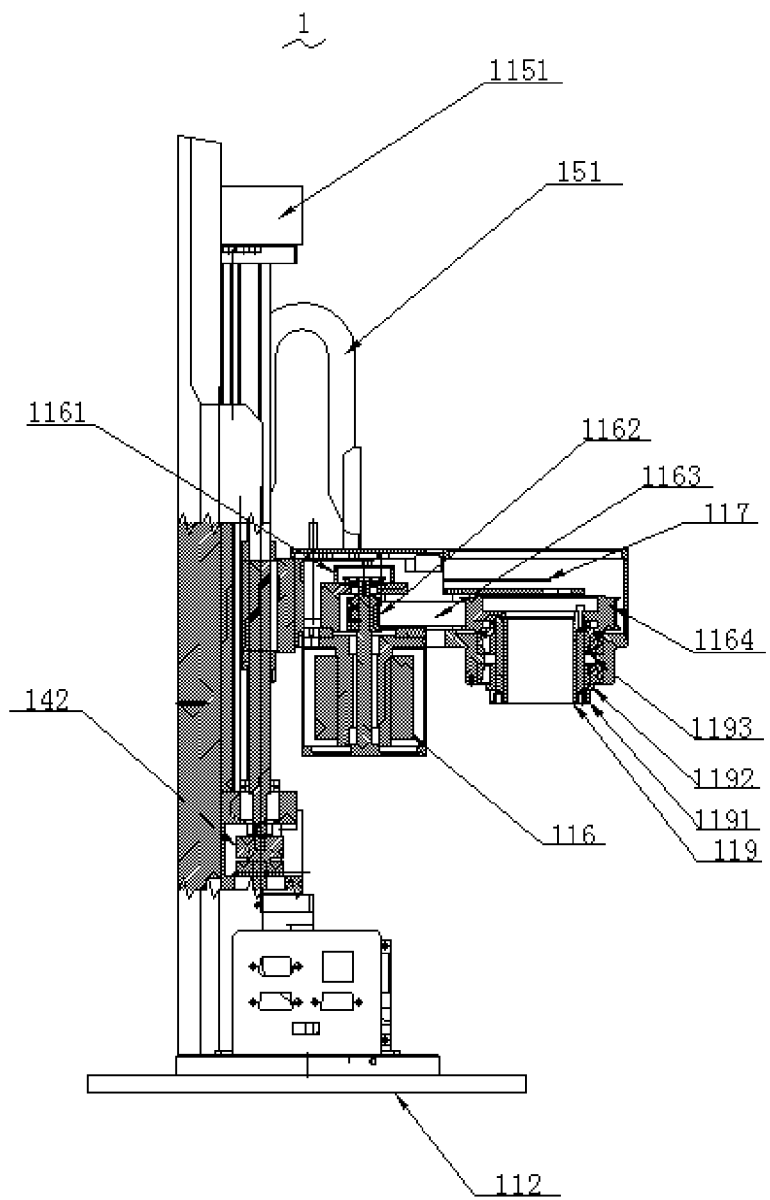
FIG. 4 is a schematic view showing the side structure of the high-performance four-axis robot with horizontal joints according to the present application.
Figure 5:
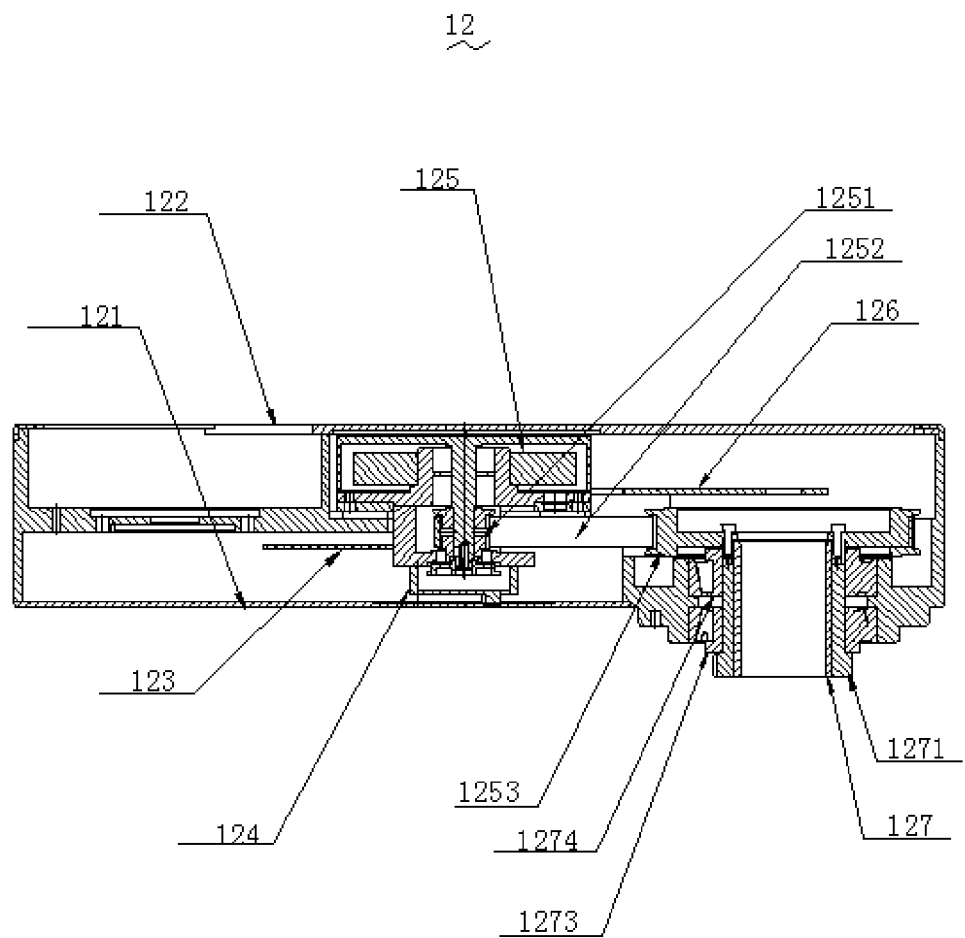
FIG. 5 is a schematic view showing the side structure of the first arm of the high-performance four-axis robot with horizontal joints according to the present application.
Figure 6:
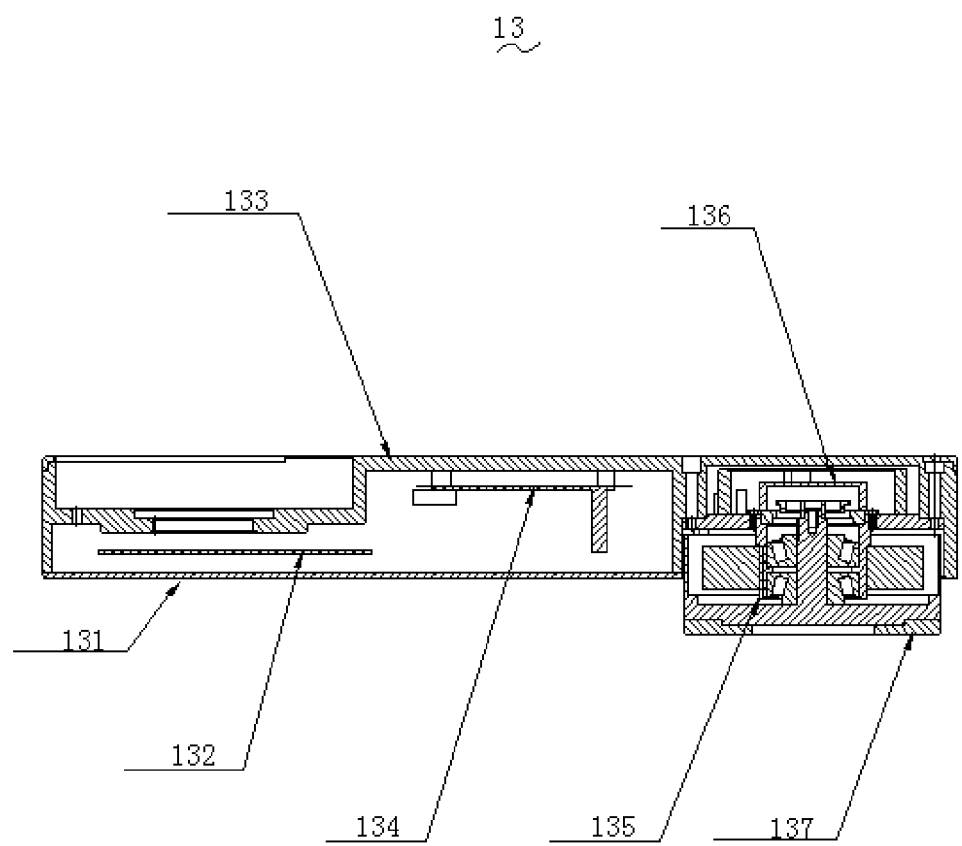
FIG. 6 is a schematic view showing the side structure of the second arm of the high-performance four-axis robot with horizontal joints according to the present application.
Figure 7:
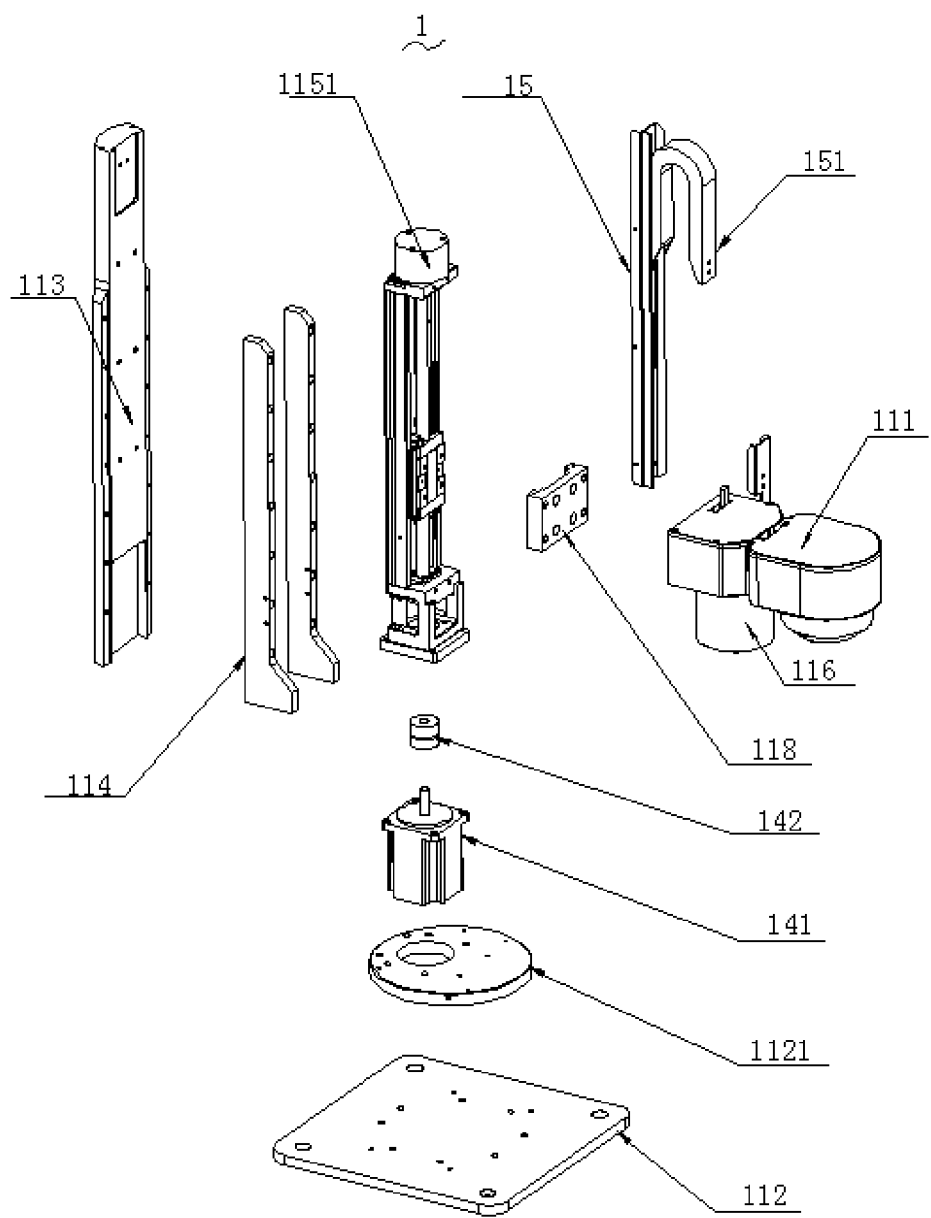
FIG. 7 is a schematic view showing the exploded structure of the high-performance four-axis robot with horizontal joints according to the present application.

Referring to FIGS. 1-7, the high-performance four-axis robot 1 with horizontal joints in the present application includes a robot body 11, a first arm assembly 12 connected to the robot body 11, a second arm assembly 13 that one end thereof is connected to the first arm assembly 12, and a R-axis rotation assembly arranged at a side of the second arm assembly 13 facing away from the first arm assembly 12. Assembly of the robot body 11 includes a linear assembly unit 115 arranged in a vertical direction, a fixed seat 111 capable of moving up and down along the linear assembly unit 115, and a drive assembly 14 configured to drive the fixed seat 111 to move and arranged at a lower position of the linear assembly unit 115. The drive assembly 14 includes a first drive motor 141 arranged at the lower position of the linear assembly unit 115 and a coupling 142 connected to an output shaft of the first drive motor 141. An inner side of the fixed seat 111 is provided with a second drive motor 116 configured to drive the rotation of the first arm assembly 12 relative to the robot body 11, and the first arm assembly 12 is internally provided with a third drive motor 125 configured to drive the rotation of the second arm assembly 13 relative to the first arm assembly 12. The R-axis rotation assembly includes a fourth drive motor 135 arranged at an outermost end of the second arm assembly 13.

The robot body 11, the first arm assembly 12 connected to the robot body 11, the second arm assembly 13 that one end thereof is connected to the first arm assembly 12, and the R-axis rotation assembly arranged at a side of the second arm assembly 13 facing away from the first arm assembly 12 are simultaneously configured, while in combination of the drive assembly 14 arranged at the lower portion of the linear assembly unit 115 and including the first drive motor 141 and the coupling 142 connected to the output shaft of the first drive motor 141, thus the mode that a driving component is arranged at the top of the body in a conventional manner is improved through arranging the driving component at the lower portion of the body, thereby achieving higher stability and good drive performance. Further, the two robot arms are suspended, and the rotating R-axis is arranged at the end of the second arm assembly 13, thus the two robot arms and the rotating R-axis move up and down at the same time when the vertical Z-axis moves. Relatively speaking, considering the weight of the arms when moving up and down, since the robot arms with this kind of structure are lighter, have shorter arm length, relatively small load and light structure, thus it is especially suitable for light load and occasions there is a requirement for end space.

Preferably, the assembly of the robot body 11 further includes a base 112, a main support plate 113, and a side plate 114 fixedly connected to the main support plate 113.

The linear assembly unit 115 is positioned between the main support plate 113 and the side plate 114, and the linear assembly unit 115 is disposed close to the main support plate 113. A slider seat 118 is disposed between the linear assembly unit 115 and the fixed seat 111, and the fixed seat 111 is fixedly connected with the slider seat 118. A side of the linear assembly unit 115 is provided with a tank drag chain 151 and a drag chain support 15 configured for supporting the tank drag chain 151.

Preferably, an upper portion of the base 112 and a lower portion of the linear assembly unit 115 are further provided with a mounting flange 1121 configured for connecting the main support plate 113 and the side plate 114. The mounting flange 1121 is fixedly connected with the lower portions of the main support plate 113 and the side plate 114, and an upper portion of the mounting flange 1121 is fixedly provided with a main outlet board 1123 and a first motor driver board 1124 configured for driving the first drive motor 141 to operate. The top of the linear assembly unit 115 is fixedly provided with an electromagnetic brake 1151, and the interior of the linear assembly unit 115 is provided with a screw shaft. The slider seat 118 is movably connected to the screw shaft, the first drive motor 141 drives the screw shaft to rotate, and drives the slider seat 118 to move up and down relative to the linear assembly unit 115.

Preferably, the interior of the fixed seat 111 is further provided with a first driving synchronous wheel 1162 connected to the output shaft of the second drive motor 116, a first driven synchronous wheel 1164, a first synchronous belt 1163 connecting the first driving synchronous wheel 1162 with the first driven synchronous wheel 1164, a second encoder 1161 disposed at an upper portion of the second drive motor 116, and a second motor driver board 117 configured for driving the motor to rotate. The outer side of the output shaft of the second drive motor 116 is further provided with a first swivel bearing. A connection portion between the fixed seat 111 and the first arm assembly 12 is provided with a first transmission shaft 119 connected with the first driven synchronous wheel 1164, and a second swivel bearing 1193 and a third swivel bearing 1192 disposed on the outer side of the first transmission shaft 119. Moreover, the bottom of the first driven synchronous wheel 1164 is provided with a wear-resistant shaft sleeve 1191 configured for holding against an inner ring of the second swivel bearing 1193 and preventing axially movement of the first transmission shaft 119. Therefore, the structure is reasonably designed, thus achieving a long service life.

Preferably, the first arm assembly 12 includes an upper cover 122 of the first arm, a lower cover 121 of the first arm, a second driving synchronous wheel 1251, a second driven synchronous wheel 1253, a second synchronous belt 1252 connecting the second driving synchronous wheel 1251 with the second driven synchronous wheel 1253, and a third encoder 124 that are disposed in an inner space formed by the upper cover 122 of the first arm and the lower cover 121 of the first arm. An output shaft of the third drive motor 125 is connected with the second driving synchronous wheel 1251. Further, the first arm assembly 12 includes a third motor driver board 123 configured for driving the third drive motor 125 to operate and a outlet board 126, and an outer side of the output shaft of the third drive motor 125 is further provided with a fourth swivel bearing. A connection portion between the first arm assembly 12 and the second arm assembly 13 is provided with a second transmission shaft 127 connected with the second driven synchronous wheel 1253, and a fifth swivel bearing 1274 and a sixth swivel bearing 1273 disposed on an outer side of the second transmission shaft 127. Moreover, the bottom of the second driven synchronous wheel 1253 is provided with a wear-resistant shaft sleeve 1271 configured for holding against an inner ring of the fifth swivel bearing 1274 and preventing axially movement of the second transmission shaft 127.

Preferably, the second arm assembly 13 includes an upper cover 133 of the second arm assembly, a lower cover 131 of the second arm assembly, an I/O card 132, a fourth motor driver board 134, and a first encoder 136 disposed on an upper portion of the fourth drive motor 135. One end of the second arm assembly 13 is connected to the second transmission shaft 127. The structure design is reasonable and the stability is strong.

Preferably, a lower portion of the fourth drive motor 135 of the R-axis rotation assembly is connected with a flange connector 137, and the upper portion of the fourth drive motor 135 is connected to the second arm assembly 13 by a screw.

Compared with the prior art, in a high-performance four-axis robot 1 with horizontal joints of the present application, the robot body 11, the first arm assembly 12 connected to the robot body 11, the second arm assembly 13 that one end thereof is connected to the first arm assembly 12, and the R-axis rotation assembly arranged at a side of the second arm assembly 13 facing away from the first arm assembly 12 are simultaneously configured, while in combination of the drive assembly 14 arranged at the lower portion of the linear assembly unit 115 and including the first drive motor 141 and the coupling 142 connected to the output shaft of the first drive motor 141, thus the mode that a driving component is arranged at the top of the body in a conventional manner is improved through arranging the driving component at the lower portion of the body, thereby achieving higher stability and good drive performance. Further, the two robot arms are suspended, and the rotating R-axis is arranged at the end of the second arm assembly 13, thus the two robot arms and the rotating R-axis move up and down at the same time when the vertical Z-axis moves. Relatively speaking, considering the weight of the arms when moving up and down, since the robot arms with this kind of structure are lighter, have shorter arm length, relatively small load and light structure, thus it is especially suitable for light load and occasions there is a requirement for end space.

The embodiments of the present application described above do not constitute limit to the scope of the present application. Any modification, equivalent substitution and improvement etc. made within the spirit and principle of the present application is intended to be included within the scope of the appended claims of the present application.

What is claimed is:

1. A high-performance four-axis robot with horizontal joints, comprising a robot body, a first arm assembly connected to the robot body, a second arm assembly with one end thereof connected to the first arm assembly, and a R-axis rotation assembly arranged at a side of the second arm assembly facing away from the first arm assembly;

wherein the robot body comprises a linear assembly unit arranged in a vertical direction, a fixed seat capable of moving up and down along the linear assembly unit, and a drive assembly configured to drive the fixed seat to move and arranged at a lower portion of the linear assembly unit; the drive assembly comprises a first drive motor arranged at the lower portion of the linear assembly unit, and a coupling connected to an output shaft of the first drive motor; an inner side of the fixed seat is provided with a second drive motor configured to drive the rotation of the first arm assembly relative to the robot body, and the first arm assembly is provided inside with a third drive motor configured to drive the rotation of the second arm assembly relative to the first arm assembly; and the R-axis rotation assembly comprises a fourth drive motor arranged at an outermost end of the second arm assembly;

wherein the second arm assembly comprises an upper cover of the second arm assembly, a lower cover of the second arm assembly, an I/O card, a fourth motor driver board, and a first encoder disposed on an upper portion of the fourth drive motor; and one end of the second arm assembly is connected to a second transmission shaft.

2. The four-axis robot according to claim 1, wherein the robot body further comprises a base, a main support plate, and a side plate fixedly connected to the main support plate; the linear assembly unit is positioned between the main support plate and the side plate; the linear assembly unit is disposed against the main support plate; a slider seat is disposed between the linear assembly unit and the fixed seat; the fixed seat is fixedly connected with the slider seat; and a side of the linear assembly unit is provided with a tank drag chain and a drag chain support configured to support the tank drag chain.

3. The four-axis robot according to claim 2, wherein a mounting flange configured to connect the main support plate and the side plate is further provided at an upper portion of the base as well as a lower portion of the linear assembly unit; the mounting flange is fixedly connected with the lower portions of the main support plate and the side plate; an upper portion of the mounting flange is further fixedly provided with a main outlet board and a first motor driver board configured to drive the first drive motor to operate; the top of the linear assembly unit is fixedly provided with an electromagnetic brake, the interior of the linear assembly unit is provided with a screw shaft movably connected to the slider seat, and the first drive motor drives the screw shaft to rotate, and drives the slider seat to move up and down relative to the linear assembly unit.

4. The four-axis robot according to claim 1, wherein the interior of the fixed seat is further provided with a first driving synchronous wheel connected to an output shaft of the second drive motor, a first driven synchronous wheel, a first synchronous belt connecting the first driving synchronous wheel with the first driven synchronous wheel, a second encoder disposed at an upper portion of the second drive motor, and a second motor driver board configured to drive the second drive motor to rotate; an outer side of the output shaft of the second drive motor is further provided with a first swivel bearing; a connection portion between the fixed seat and the first arm assembly is provided with a first transmission shaft connected with the first driven synchronous wheel, and a second swivel bearing and a third swivel bearing disposed on an outer side of the first transmission shaft; and the bottom of the first driven synchronous wheel is provided with a wear-resistant shaft sleeve configured to hold against an inner ring of the second swivel bearing and prevent axial movement of the first transmission shaft.

5. The four-axis robot according to claim 4, wherein the first arm assembly comprises an upper cover of the first arm assembly, a lower cover of the first arm assembly, and a second driving synchronous wheel, a second driven synchronous wheel, a second synchronous belt connecting the second driving synchronous wheel with the second driven synchronous wheel and a third encoder that are disposed in an inner space formed by the upper cover of the first arm assembly and the lower cover of the first arm assembly; and an output shaft of the third drive motor is connected with the second driving synchronous wheel; wherein the first arm assembly further comprises a third motor driver board configured to drive the third drive motor to operate and an outlet board; and an outer side of the output shaft of the third drive motor is further provided with a fourth swivel bearing; a connection portion between the first arm assembly and the second arm assembly is provided with a second transmission shaft connected with the second driven synchronous wheel, and a fifth swivel bearing and a sixth swivel bearing disposed on an outer side of the second transmission shaft; and the bottom of the second driven synchronous wheel is provided with a wear-resistant shaft sleeve configured to hold against an inner ring of the fifth swivel bearing and prevent axially movement of the second transmission shaft.

6. The four-axis robot according to claim 1, wherein a lower portion of the fourth drive motor of the R-axis rotation assembly is connected with a flange connector, and an upper portion of the fourth drive motor is connected to the second arm assembly by a screw.

7. The four-axis robot according to claim 1, wherein a lower portion of the fourth drive motor of the R-axis rotation assembly is connected with a flange connector, and an upper portion of the fourth drive motor is connected to the second arm assembly by a screw.

* * * * *